US005298308A

United States Patent [19]

Yamane et al.

[11] Patent Number: 5,298,308

[45] Date of Patent: Mar. 29, 1994

[54] IMAGE-RETRANSFERABLE SHEET HAVING A LAYER OF A SURFACE TREATING AGENT

[75] Inventors: Mitsuo Yamane, Yokkaichi; Takashi Kawaguchi, Aichi, both of Japan

[73] Assignee: Brother Kogyo Kabushiki Kaisha, Nagoya, Japan

[21] Appl. No.: 820,007

[22] Filed: Jan. 13, 1992

Related U.S. Application Data

[63] Continuation-in-part of Ser. No. 666,743, Mar. 8, 1991, abandoned.

[30] Foreign Application Priority Data

| | | | |
|---|---|---|---|
| Mar. 16, 1990 | [JP] | Japan | 2-67973 |
| Mar. 16, 1990 | [JP] | Japan | 2-67974 |
| Feb. 27, 1991 | [JP] | Japan | 3-32689 |
| Feb. 27, 1991 | [JP] | Japan | 3-32690 |

[51] Int. Cl.[5] ..... B32B 9/00

[52] U.S. Cl. ..... 428/195; 428/212; 428/337; 428/446; 428/484; 428/688; 428/913; 428/914; 430/126

[58] Field of Search ..... 428/195, 327, 447, 484, 428/488.1, 2 R, 913, 914, 202, 207, 688, 446, 488.4, 500, 520; 156/235; 430/126

[56] References Cited

U.S. PATENT DOCUMENTS

| | | | |
|---|---|---|---|
| 4,704,313 | 11/1987 | Tighe et al. | 428/349 |
| 4,778,729 | 10/1988 | Mizobuchi | 428/484 |
| 4,870,427 | 9/1989 | Kobayashi et al. | 346/1.1 |
| 4,973,509 | 11/1990 | Yamane | 428/195 |

FOREIGN PATENT DOCUMENTS

| | | |
|---|---|---|
| 63-128987 | 6/1988 | Japan . |
| 63-234453 | 9/1988 | Japan . |
| 63-239944 | 9/1988 | Japan . |
| 2-81684 | 3/1990 | Japan . |
| 2-88294 | 3/1990 | Japan . |

*Primary Examiner*—Patrick J. Ryan
*Assistant Examiner*—William A. Krynski
*Attorney, Agent, or Firm*—Oliff & Berridge

[57] ABSTRACT

An image-retransferable sheet for retransferring an image of an fused ink transferred from an ink ribbon by a heat sensitive transferring method onto an image receiving member is disclosed. The image-retransferable sheet comprises a substrate having a first surface and a second surface which is opposed to the first surface and a layer of a surface treating agent coated on the first surface of the substrate. The layer has an exposed surface and a tensile strength of from 1 kg/cm$^2$ to 100 kg/cm$^2$. An ink image is formed on the exposed surface of the layer of the surface treating agent coated on the first surface of the substrate by a heat sensitive transferring method. The ink image is retransferred onto the image receiving member together with the layer of the surface treating agent releasing from the first surface of the substrate by application of pressure to the second surface of the substrate so that the layer of the surface treating agent covers the ink image retransferred on the image receiving member.

18 Claims, 3 Drawing Sheets

IMAGE-RETRANSFERABLE SHEET HAVING A LAYER OF A SURFACE TREATING AGENT

CONTINUING DATA

This application is a continuation-in-part of copending U.S. patent application Ser. No. 07/666,743 filed on Mar. 8, 1991, now abandoned, in the names MITSUO YAMANE and TAKASHI KAWAGUCHI which is incorporated herein by reference.

BACKGROUND OF THE INVENTION

1. Field of the Invention

The present invention relates to an image-retransferable sheet having a layer of a surface treating agent and more particularly to an image-retransferable sheet to which an image including letters, symbols and figures are thermally printed by a heat-sensitive image-transferring type printer and from which the thermally transferred image are retransferred onto a surface of an image-receiving material with pressure.

2. Description of the Prior Art

It is known to produce graphic images including letters, symbols and figures by a thermal transferring head equipped in a heat-sensitive image-transferring type printer. The thermal printer uses a thermal ink ribbon and a thermal printer head which presses the thermal ink ribbon and applies heat thereon in order to transfer an image from the thermal ink ribbon onto a recording sheet. The ink ribbon is disclosed, for example, in U.S. Pat. No. 4,778,729. However a transferred image of the thermal ink ribbon disclosed in U.S. Pat. No. 4,778,729 can be formed on the recording sheet which is used in the thermal printer and cannot be used for an image-retransferable sheet to which an image including letters, symbols and figures are thermally printed and from which the thermally transferred image are retransferred onto a surface of an image-receiving material by pressure.

Tape printers, such as those sold under the mark P-Touch by Brother Industries Co., Ltd., have been developed. Such tape printers employ an image-retransferable sheet, such as those disclosed in U.S. Pat. No. 4,870,427 and corresponding unexamined and published Japanese patent application No. 63-128987. Such image-retransferable sheets have a substrate 331 and a release layer 332 supported thereon as shown in FIG. 3B. In the image-retransferable sheet 33, fluorine-based resin films, papers, coated papers, metal foils or plastic films of polyethylene or polypropylene are used as the substrate 331 and the release layer 332 is coated on the substrate 331.

As shown in FIG. 3A, tape printer 30 uses a thermal ink transfer ribbon 31 and a thermal printer head 32 mounted in the tape printer 30. In the tape printer 30, the thermal printer head 32 presses the thermal ink ribbon 31 onto the image-retransferable sheet 33 and applies heat thereon in order to transfer a fused thermal ink image 34 onto the image-retransferable sheet 33. Therefore, the ink image 34 of the ink layer is formed on the release layer 332 of the image-retransferable sheet 33 as shown in FIG. 3B.

Next, the user of the tape printer 30 arranges the image-retransferable sheet 33 so that the ink image 34 and a front side 33A of the image-retransferable sheet 33 face and are placed in close contact with an image receiving member 35. An image of the fused ink 34 is transferred onto the image receiving member 35 by application of pressure to a back side 33B of the image-retransferable sheet 33, in a manner that the image of the fused ink 34 is separated from the front side 33A of the release layer 332 and the fused ink 34 is transferred to a front face of the image receiving member 35. As shown in FIG. 3C, the user forms the image of the fused ink 34 on the image receiving member 35 which the user desires to form thereon.

In the above transferring process from the ink ribbon 31 to the image-retransferable sheet 33 by heat of the thermal head 32, the image of the fused ink 34 is required to be transferred onto the image-retransferable sheet 33 steadily and in the above retransferring process from the image-retransferable sheet 33 to the image receiving member 35 by application of pressure, the image of the fused ink 34 is required to be retransferred onto an image receiving member 35 steadily. To obtain the steady transfer and retransfer, an image-retransferable sheet 33 having the release layer 332 comprising a silicone resin, the release layer 332 having a smooth surface thereon and exhibiting a contact angle with water of at least 95°, has been developed.

However, in order to thermally print an image onto the image-retransferable sheet 33 having a water contact angle of at least 95° and particularly not less than 105°, it is necessary to reduce the surface tension of the fused ink 34 to wet the sheet 33 and it is further necessary to increase adhesion between the fused ink 34 and the sheet 33 to a level greater than the cohesive force between the fused ink 34 and a base layer of the thermal transfer ribbon 31, such as polyethylene terephthalate film. For the purpose, the temperature of the fused ink 34 must be increased in order to reduce the surface tension of the fused ink 34 when the image is thermally printed on the sheet 33. Therefore, high energy must be applied to the thermal head 32 which is disadvantageous in view of durability of the thermal head 32 and load on a power supply.

Further, ink images formed on a sheet 33 having poor wettability are easily retransferred with little pressure because of poor adhesion to the sheet 33, and a portion of the image which is desired to be left on the sheet 33 is undesirably retransferred to the image receiving member 35, causing stains on the image-receiving member 35. Such easy retransfer is troublesome in handling of the sheet 33.

Furthermore, since the sheet 33 has an extremely small static friction coefficient, the sheet 33 is not easily fixed during retransfer of the thermally printed image from the sheet 33 to the image-receiving member 35, so that the image of the fused ink 34 is retransferred on an undesired portion of the image-receiving member 35 or distorted on the image receiving member 35.

Surface treating agents in the release layer 332 are used in conventional image-retransferable sheets 33 to improve the property of retransferring an ink image from the sheet 33, so that the user can easily retransfer the fused ink 34 on the sheet 33 to the image receiving member 35. However, the release layer 332 is not transferred to an image-receiving member 35 with the image of the fused ink 34. Therefore, the image-retransferable sheet 33 necessarily must have poor wettability, to reduce adhesion between the sheet 33 and the ink image of the fused ink 34. Because of the features of such an image-transferable sheet 33, however, the sheet 33 suffers from various problems, such as reduced capability in receiving an ink image thermally printed or transferred from an ink ribbon 31, increased energy needed for thermally transferring an ink image, and poor resistance to friction of an ink image thermally transferred.

SUMMARY OF THE INVENTION

A first object of the invention is to provide an image-retransferable sheet which is easily fixed during the image-retransfer step.

A second object of the invention is to provide an image-retransferable sheet capable of retaining a thermally printed ink image thereon even when slightly rubbed or having pressure applied thereto.

A third object of the invention is to provide an image-retransferable sheet capable of receiving an ink image of good quality by thermal printing with low energy, thereby prolonging the life of the thermal printing head.

A fourth object of the invention is to provide an image-retransferable sheet capable of completely retransferring an ink image without leaving any ink on the sheet.

A fifth object of the invention is to provide an image-retransferable sheet which is easy to check whether or not an ink image printed thereon is retransferred to an image-receiving material.

A sixth object of the invention is to provide an image-retransferable sheet which can provide a retransferred ink image with improved resistance to friction.

A seventh object of the invention is to provide an image-retransferable sheet having a layer of a surface treating agent the tensile strength of which can be easily controlled, so that the image-retransferring property can be adjusted with ease.

The above objects have been attained by an image-retransferable sheet for retransferring an image formed of a heat sensitive transferred ink onto an image receiving member comprising: a substrate having a first surface and a second surface which is opposed to the first surface; a layer of a surface treating agent coated on the first surface of the substrate, the layer having an exposed surface and a tensile strength of from 1 $kg/cm^2$ to 100 $kg/cm^2$; and an ink image formed on the exposed surface of the layer of the surface treating agent coated on the first surface of the substrate, the ink image being transferred by the heat sensitive transferring method onto the exposed surface of the layer, whereby the ink image is retransferred onto the image receiving member together with the layer of the surface treating agent releasing from the first surface of the substrate by application of pressure to the second surface of the substrate, so that the layer of the surface treating agent covers the ink image retransferred on the image receiving member.

According to the invention having above structure, the surface treating layer which is formed on the first surface of the substrate has tensile strength of from 1 $kg/cm^2$ to 100 $kg/cm^2$. This property is required so as to retransfer a thermally transferred ink image together with the underlying layer of surface treating agent releasing from the first surface of the substrate onto the image receiving member. That is, when the tensile strength in the layer of the surface treating agent exceeds 100 $kg/cm^2$, the cohesive force of the surface treating agent in the layer is too strong, resulting in formation of a tough layer of the surface treating agent which cannot be transferred merely by applying pressure to the second surface of the image-retransferable sheet. When the tensile strength in the layer of the surface treating agent is less than 1 $kg/cm^2$, on the other hand, the layer strength of the resulting layer is so weak that the layer of the surface treating agent is broken in pieces when the image-retransferable sheet is folded.

BRIEF DESCRIPTION OF THE DRAWINGS

The foregoing and other objects, features, and advantages of the invention will become more apparent from reading the following description of the preferred embodiments taken in connection with accompanying drawings in which.

DETAILED DESCRIPTION OF THE EMBODIMENTS

Figure 1:
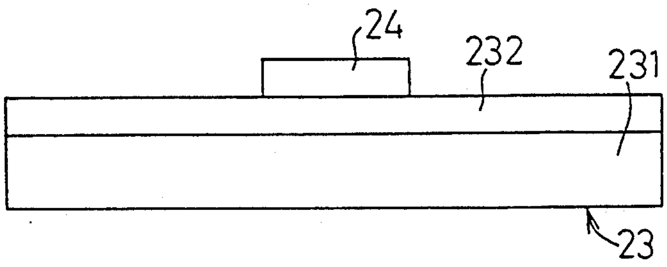
FIG. 1 is a cross-sectional view of an image-retransferable sheet of this embodiment in the present invention having an ink image thereon.

As shown in FIG. 1, an image-retransferable sheet 23 of the present invention comprises a substrate 231 and a layer 232 of a surface treating agent (hereafter referred to as "surface treating layer") on one surface thereof which is supported on the substrate 231. The ink image 24 of the fused ink is formed on the surface treating layer 232.

Figure 2A:
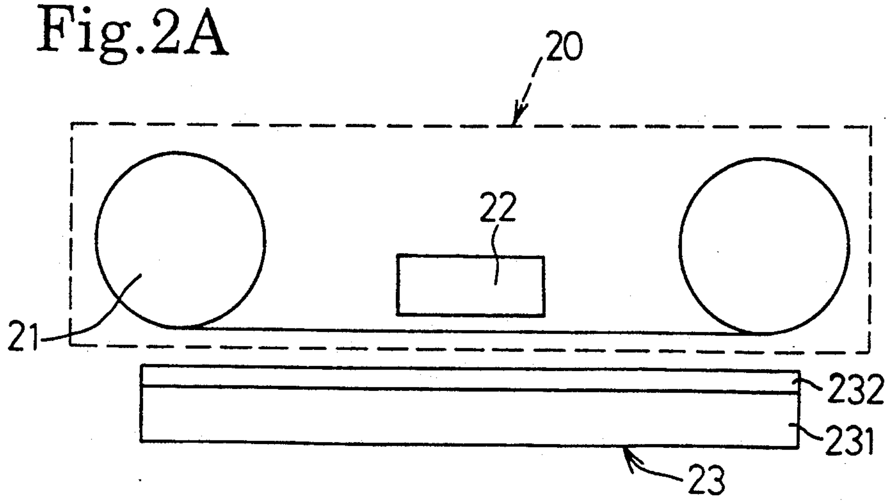
FIG. 2A is a schematic cross-sectional view of this embodiment showing the process of transferring an image from the ink ribbon to the image-retransferable sheet carried out by heat of the thermal transferring head.
Figure 2B:
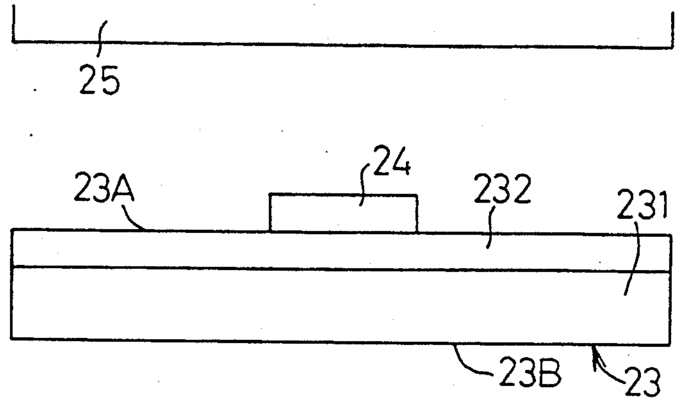
FIG. 2B is a schematic cross-sectional view of this embodiment showing a situation when the retransferring process from the image-retransferable sheet to the image receiving member is carried out by application of pressure.

As shown in FIG. 2A, the tape printer 20 uses a thermal ink transfer ribbon 21 and a thermal printer head 22 equipped in the tape printer 20. In the tape printer 20, the thermal printer head 22 presses the thermal ink image 24 to the image-retransferable sheet 23 and applies heat thereon in order to transfer a fused thermal ink ribbon 21 onto the image-retransferable sheet 23. Therefore, the ink image 24 of the fused ink is formed on the surface treating layer 232 of the image-retransferable sheet 23 as shown in FIG. 2B. The user of the tape printer 20 first forms an image of fused ink 24 from ink ribbon 21 on the image-retransferable sheet 23, which supports the fused ink image 24 from the thermal ink transfer ribbon 21. Next, the user of the tape printer 20 arranges the image-retransferable sheet 23 so that a front side 23A and the fused ink 24 thereof face and are placed on the image receiving member 25.

Figure 2C:
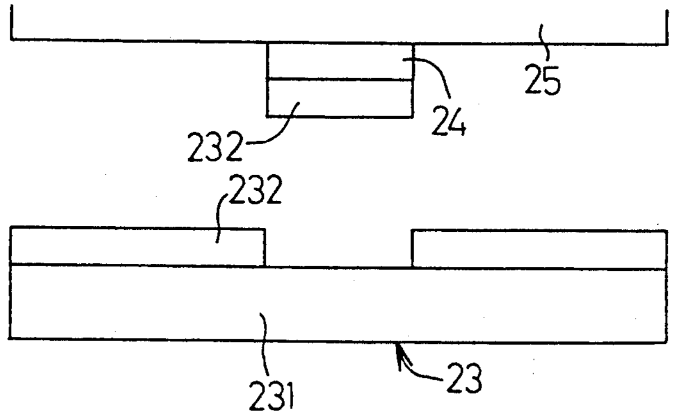
FIG. 2C is a schematic cross-sectional view of this embodiment showing a situation when the retransferring ink image is attached on an image receiving member.
Figure 3A:
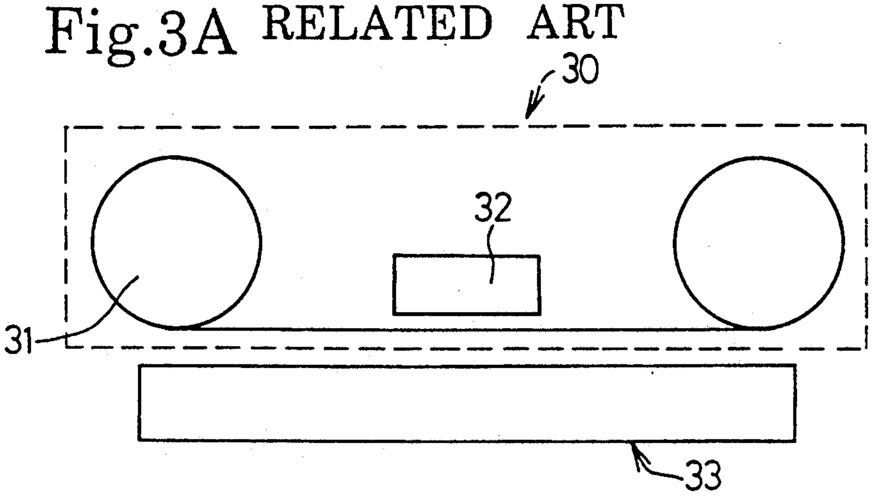
Fig.3A RELATED ART
FIG. 3A is a schematic cross-sectional view of a conventional process showing the transfer of the ink from the ink ribbon to the image-retransferable sheet carried out by heat of the thermally transferring head.
Figure 3B:
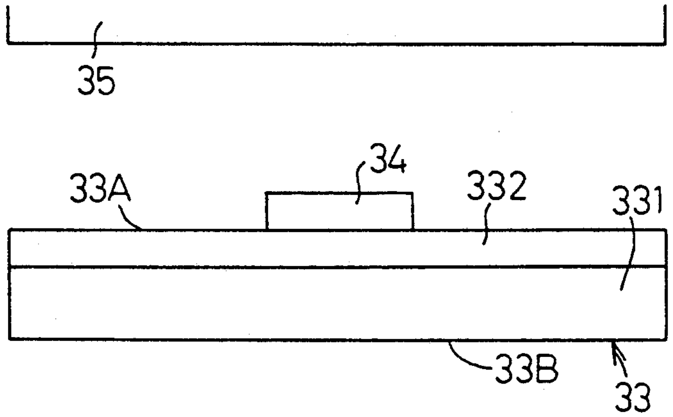
Fig.3B RELATED ART
FIG. 3B is a schematic cross-sectional view in a conventional process showing the retransferring of the ink image from the image-retransferable sheet to the image receiving member by application of pressure.
Figure 3C:
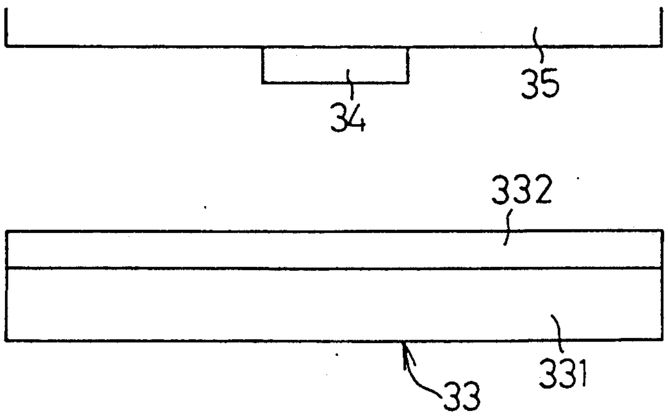
Fig.3C RELATED ART
FIG. 3C is a schematic cross-sectional view in a conventional process showing the retransferred ink image attached on an image receiving member.

An image of the fused ink 24 is transferred onto the image receiving member 25 by application of pressure to a back side 23B of the image-retransferable sheet 23 in a manner that the image of the fused ink 24 is separated from a front surface of the substrate 231 and both the surface treating layer 232 and the image of the fused ink 24 are transferred onto the image receiving member 25. In this manner, as shown in FIG. 2C, the user forms the desired image of the fused ink 24 on the image receiving member 25.

The substrate 231 preferably has a thickness of from 25 to 200 microns and more preferably from 50 to 150 microns. Further, it is preferred that the substrate 231 not only have a mechanical strength sufficient to be handled in production of the image-retransferable sheet 23 but also have flexibility to such an extent that pressure can easily act upon the ink image 24 on the sheet 23 during the step of retransferring the image with pressure and that the ink image 24 as a dry processing type image-transferring material can be easily produced by thermally printing on the sheet 23.

However, a substrate which has too great an elongation is not preferred since the substrate is stretched too much when pressure is applied to retransfer of the ink image 24, causing distortion of the image. The substrate 231 preferably has elongation of not more than 200%.

To ensure retransfer of the ink image 24 precisely onto the image-receiving member 25 with pressure, the substrate 231 is preferably transparent or semi-transparent. Semi-transparent substrates are particularly preferred, since it is easy to check whether or not the ink image 24 is completely retransferred from the image-retransferable sheet 23 onto the image-receiving member 25 with pressure.

Examples of the substrate 231 having the above properties include paper, metal foil and plastic films. Suitable plastic films are fluorine-based films of fluorine-containing resins (e.g., ethylene/tetrafluoroethylene copolymer and tetrafluoroethylene/hexa-fluoroethylene copolymer), films of polyethylene, polypropylene, polyethylene terephthalate, nylon, polyimide, polyvinyl chloride, polycarbonate, polysulfone, ethylene/vinyl acetate copolymer, acrylonitrile/buta-diene/styrene copolymer or ionomer resin.

The surface treating layer 232 which is formed on one surface of the substrate 231 has a tensile strength of from 1 to 100 kg/cm$^2$ and preferably has a tensile strength in a range from about 1 to about 20 kg/cm$^2$. This property is required so as to retransfer a thermally printed ink image 24 together with the underlying surface treating layer 232 onto the image receiving member 25, such as wood, plastic film or paper. That is, when the tensile strength of the layer 232 exceeds 100 kg/cm$^2$, the cohesive force of the surface treating agent in the surface treating layer 232 is too strong, resulting in formation of a tough layer which cannot be transferred merely by applying pressure to the back side 23B of the image-retransferable sheet 23. When the tensile strength of the layer 232 is less than 1 kg/cm$^2$, on the other hand, the layer strength of the resulting layer is so weak that the layer 232 is easily broken when the image-retransferable sheet 23 is folded.

It is preferred that the surface treating agent of the layer 232 have a melting or softening point of at least 100° C., or a melt viscosity at 100° C. of at least 1000 poises. When a material which melts or becomes markedly soft below 100° C. is used as a surface treating agent of the layer 232, the surface treating layer 232 melts upon thermal printing of an ink image on the sheet 23 and exhibits increased adhesion to the substrate 231, deteriorating the image-retransferring property.

Use of the surface treating agent of the layer 232 having the above specified tensile strength and melting or softening points makes it possible to retransfer the surface treating layer 232 together with an thermally printed ink image 24. Therefore, there is no need for taking wettability of the surface treating agent of the layer 232 into account, and a thermally printed ink image 24 of good quality can be formed on the sheet 23 with low energy. Therefore, the life of the thermal head 22 is extended. Further, the image-retransferable sheet 23 is capable of receiving the ink image 24 on the surface treating layer 232 with high adhesion. Therefore, the image retransferable sheet 23 is capable of retaining a thermally printed ink image 24 thereon, even when slightly rubbed or having pressure applied thereto, since the surface 23A of the layer 232 having improved resistance to friction is used, instead of material providing a low friction surface, such as the silicone resins mentioned previously. Furthermore, since the static friction coefficient of the surface 23A of the layer 232 can be increased, in comparison to the previously mentioned silicone resin layer 332, the sheet 23 can be placed on the image receiving member 25 and does not tend to slip during the image retransferring step, thereby forming a retransferred image simply and finely on the image receiving member 25.

For printing a large image onto an image-retransferable sheet 23 using a heat-sensitive image-transferring device with a serial type small head, it has hitherto been needed to print the large image in parts in such a manner that portions of the image are printed to slightly overlap each other so that the partial print of the image is often scratched by the head upon subsequent printing of another portion of the image. Therefore, the image is divided line after line and thermally printed to the sheet with a little space therebetween to avoid scratching with the head, and each of the divided partial images printed is then retransferred subsequently to be put together on an image-receiving material. Use of the image-retransferable sheet 23 of the present invention, however, makes it possible to thermally print a large image as such because of the high adhesion as described above.

The advantages of the present invention due to retransfer of a printed ink image together with the surface treating agent are:

(i) the ink image 24 can be completely retransferred on to the image receiving member 25 without any residual ink on the sheet 231, (ii) it is easy to check whether or not the ink image 24 is retransferred on to the image receiving member 25, and (iii)the surface treating layer 232 transferred with the ink image 24 functions as a protective layer so that the resistance to friction of the retransferred image 24 is improved.

The surface treating layer 232 of this embodiment is mainly composed of one or more of surface treating agents exemplified by resins such as polyethylene, ethylene/vinyl acetate copolymer, vinyl chloride/vinyl acetate copolymer, polyvinyl butyral, celluloses, ethylene/ethyl acrylate copolymer, ethylene/acrylic acid copolymer, ionomer rein, ethylene/methacrylic acid copolymer, polyvinyl alcohol, polyvinyl pyrrolidone and silicone resins, and waxes such as polyethylene wax, montan wax, Fischer-Tropsch wax and synthetic wax.

In particular, wax is preferably included as one component in the surface treating layer since the tensile strength of the layer can be precisely adjusted by controlling the amount of wax added, whereby a wide variety of materials can be used as a surface treating agent and, in addition, the image-retransferring property can be markedly improved.

The surface treating layer 232 may be formed on one surface of the substrate 231 in a conventional manner. When the above described resins are used as main components of the layer 232, they are preferably used in the form of fine dispersion, such as an emulsion or a suspension, instead of being dissolved in a solvent or hot-melted, which increases the tensile strength too much. The surface treating layer 232 may contain fillers to control the tensile strength and adhesion. The surface treating layer 232 is preferably transparent so that a retransferred image can be seen through the layer 232.

By providing the surface treating layer of the present invention an image-retransferable sheet can be obtained which receives the thermally printed image well, with good adhesion of the thermally printed image. The image retransferable sheet has good fixability during retransfer of images and provides a retransferred image with good resistance to friction. The sheet is easily checked whether or not an image is retransferred therefrom.

Any ink ribbon conventionally used in a heat-sensitive image-transferring type printer, typewriter, word processor, etc. may be used for thermally forming an image on the image-retransferable sheet 23 of the present invention. Suitable ink ribbons may be those which have a coating of ink mainly composed of wax and preferably those having a layer for controlling image transferring properties to further improve heat-and pressure-sensitive image-transferring properties. The layer for controlling image-transferring properties is provided on the ink layer as a top coating and has high heat-sensitive adhesion, hardness, viscosity and cohesion, as compared to the ink layer, whereby thermal transferability of the ink, particularly to an image-retransferable sheet 23 having poor wettability, is enhanced. These layers of the image thermally transferred on an image-retransferable sheet 23 are retransferred together onto an image receiving material when pressure is applied. If a pressure-sensitive adhesive property is imparted to the ink layer, the pressuresensitive image-retransferring property can further be improved.

The present invention is further explained in detail with reference to the following examples, but the present invention is not to be construed as being limited thereto. In the examples, all parts are by weight.

EXAMPLE 1

The following coating composition was coated on a 50 micron thick polyethylene terephthalate film and dried at 80° C. to form a smooth surface treating layer having a contact angle with water of 39° and a static friction coefficient of about 0.42. The surface treating layer had tensile strength of about 20 kg/cm$^2$ and a melt viscosity at 150° C. of about 2000 to 4000 poises. Known methods, such as Gravure roll coating, bar coating or reverse roll coating are used to coat the film.

| Coating Composition for Surface Treating Layer: | |
|---|---|
| Polyethylene<br>("Chemipearl M-200", produced by Mitsui Petrochemical Industries, Ltd.) | 10 weight portions |

Onto the thus prepared image-retransferable sheet 23 was thermally transferred an ink using a heat-sensitive transferring type word processor ("P-TOUCH", produced by Brother Industries, Ltd.), whereby a dry-processing image-transferring material having an ink image 24 of good quality could be obtained with less thermal energy than that using a conventional image-retransferable sheet 23. When the ink image 24 of the dry-processing type image-transferring material was retransferred to an image receiving member 25, such as paper and plastic articles, by applying pressure thereto, a clear retransferred image was formed on the image receiving member 25. The dry-processing type image-transferring material on the sheet 23 is hardly moved when pressure was applied, so that it was easy to obtain a good retransferred image. Further, since the surface treating layer 232 was transferred together with the ink image 24, it was easy to check whether the retransferred image was completed and the resulting retransferred image covered with the surface treating layer 232 exhibited good resistance to friction.

EXAMPLE 2

The following coating composition was coated on a 100-micron thick nylon film and dried at 80° C. to form a smooth surface treating layer having a contact angle with water of 76° and a static friction coefficient of about 0.77. The surface treating layer had tensile strength of 15 kg/cm$^2$ and a melt viscosity at 150° C. of about 5000 poises.

| Coating Composition for Surface Treating Layer: | |
|---|---|
| Ionomer resin<br>("Chemipearl SA-100", produced by Mitsui Petrochemical Industries, Ltd.) | 10 weight portions |

Using the thus prepared image-retransferable sheet 23, a dry processing type image-transferring material was produced in the same manner as in Example 1 and subjected to pressure-sensitive image-retransferring processing. As a result, a clear retransferred image was formed on the image receiving member.

EXAMPLE 3

The following coating composition was coated on a 50-micron thick polyethylene terephthalate film and dried at 80° C. to form a smooth surface treating layer having tensile strength of about 20 kg/cm$^2$ and a melting point of 120° C.

| Coating Composition for Surface Treating Layer: | |
|---|---|
| Polyethylene wax<br>("Chemipearl W-100", produced by Mitsui Petrochemical Industries, Ltd.) | 9 weight portions |
| Ethylene-vinyl acetate copolymer<br>("Chemipearl V-300", produced by Mitsui Petrochemical Industries, Ltd.) | 1 weight portion |

Using the thus prepared image-retransferable sheet 23, a dry processing type image-transferring material was produced in the same manner as in Example 1 and subjected to pressure sensitive image-retransferring processing. As a result, a clear retransferred image was formed on an image receiving member 25.

EXAMPLE 4

The following coating composition was coated on a 100-micron thick nylon film and dried at 80° C. to form a smooth surface treating layer having tensile strength of 10 kg/cm$^2$ and a melting point of 109° C.

| Coating Composition for Surface Treating Layer: | |
|---|---|
| Polyethylene wax ("Mitsui High Wax 110P", produced by Mitsui Petrochemical Industries, Ltd.) | 10 weight portions |
| Toluene | 90 weight portions |

Using the thus prepared image-retransferable sheet 23, a dry-processing type image-transferring material was produced in the same manner as in Example 1 and subjected to pressure-sensitive image-retransferring processing. As a result, a clear retransferred image was formed on an image-receiving member.

Next, a second embodiment will be described below. In this embodiment, the surface treating layer is mainly composed of one or more of surface treating agents exemplified by resins such as polyethylene, ethylene/vinyl acetate copolymer, vinyl chloride/vinyl acetate copolymer, polyvinyl butyral, celluloses, ethylene/ethyl acrylate copolymer, ethylene/acrylic acid copolymer, ionomer resin, ethylene/methacrylic acid copolymer, polyvinyl alcohol, and polyvinyl pyrrolidone. The surface treating layer further comprises one or more silicone compounds such as silicone resins, silicone oil and silicone powder.

When the surface treating layer is transferred to the image receiving member together with the fused ink, portions of the surface treating layer other than where the fused ink is located may be transferred to the image receiving surface. However, if a silicone compound is added to the surface treating layer, adhesive force and cohesive force in the surface treating layer are adjusted and controlled in accordance with the amount of the silicone compound added thereto. Therefore the transfer of the surface treating layer other than where the fused ink is located is prevented by the lowering of the adhesive force and the cohesive force in the surface treating layer in accordance with added amount of silicone compound.

Further, waxes such as polyethylene wax, montan wax, Fischer-Tropsch wax and synthetic wax preferably form one component of the surface treating layer, because the tensile strength of the layer can be precisely adjusted by controlling the amount of wax added, whereby a wide variety of materials can be used as a surface treating agent and in addition, the image-retransferring property can be markedly improved. Further, pigments and coloring agents being may be contained as one component in the surface treating layer to color the image receiving member by color of the pigments, the coloring agents being in addition to the color of the fused ink of the ink layer.

EXAMPLE 5

The following coating composition was coated on a 50 micron thick polyethylene terephthalate film and dried to form a smooth surface treating layer having a contact angle with water of 39° and a static friction coefficient of about 0.42. The surface treating layer had tensile strength of about 20 kg/cm$^2$ and a melt viscosity at 150° C. of about 2000 to 4000 poises.

| Coating Composition for Surface Treating Layer: | |
|---|---|
| Polyethylene ("Chemipearl M-200", produced by Mitsui Petrochemical Industries, Ltd.) | 70 weight portions |
| Titanium oxide ("TIPAQUE A-100", produced by Ishihara Sangyo Kaisha) | 20 weight portions |
| Silicone resin ("KM766", produced by Shin-Etsu Chemical Co., Ltd.) | 10 weight portions |
| Hardening catalyst ("PL-6AB", produced by Shin-Etsu Chemical Co., Ltd.) | 0.03 weight portions |

Onto the thus prepared image-retransferable sheet was thermally transferred a white ink using a heat-sensitive transferring type word processor ("P-TOUCH", produced by Brother Industries, Ltd.), whereby a dry-processing image-transferring material having a white ink image of good quality could be obtained with less thermal energy than that using a conventional image-retransferable sheet. When the ink image of the dry-processing type image-transferring material was re-transferred to an image-receiving member, such as paper and plastic articles, by applying pressure thereto, a clear retransferred image was formed on the image receiving member. The dry-processing type image-transferring material on the sheet is hardly moved when applied pressure, so that it was easy to obtain a good retransferred image. Further, since the surface treating layer was transferred together with the ink image, it was easy to check whether the retransferred image was completed and the resulting retransferred image covered with the surface treating layer exhibited good resistance to friction.

EXAMPLE 6

The following coating composition was coated on a 100-micron thick nylon film and dried to form a smooth surface treating layer having a contact angle with water of 76° and a static friction coefficient of about 0.77. The surface treating layer had tensile strength of 15 kg/cm$^2$ and a melt viscosity at 150° C. of about 5000 poises.

| Coating Composition for Surface Treating Layer: | |
|---|---|
| Ionomer Resin ("Chemipearl SA-100", produced by Mitsui Petrochemical Industries, Ltd.) | 70 weight portions |
| Azo organic pigment ("CROMOPHTAL Yellow 3G", produced by CIBA GEIGY) | 20 weight portions |
| Silicone oil ("KP316", produced by Shin-Etsu Chemical Co., Ltd.) | 10 weight portions |

Using the thus prepared image-retransferable sheet, a dry processing type image-transferring material was produced in the same manner as in Example 1 and subjected to pressure-sensitive image-retransferring processing. As a result, a clear retransferred image was formed on the image receiving member. Is a result of adding the silicone compound to the surface treating layer, the transfer of the surface treating layer from portions other than where the fused ink is located the transfer is prevented.

Next, a third embodiment will be described below. In this embodiment, the surface treating layer is mainly composed of one or more of surface treating agents exemplified by resins such as polyethylene, ethylene/vinyl acetate copolymer, vinyl chloride/vinyl acetate copolymer, polyvinyl butyral, celluloses, ethylene/ethyl acrylate copolymer, ethylene/acrylic acid copolymer, ionomer resin, ethylene/methacrylic acid copolymer, polyvinyl alcohol, polyvinyl pyrrolidone. The surface treating layer further comprises one or more of fluorine compounds such as fluorine surface active agents and fluorine surface reforming agents.

As mentioned above, when the surface treating layer is transferred to the image receiving member together with the fused ink, the surface treating layer from location other than where the fused ink is located may be transferred onto the image receiving layer. However the fluorine compounds are added to the surface treating layer, the adhesive force and cohesive force in the surface treating layer are adjusted and controlled in accordance with the added amount of the fluorine compound. Therefore the transfer of the surface treating layer from locations where the fused ink is not located is prevented on the basis of the lowering the adhesive force and the cohesive force in the surface treating layer in accordance with the added amount of the fluorine compound thereto.

Further, waxes such as polyethylene wax, montan wax, Fischer-Tropsch wax and synthetic wax are preferably contained as one component in the surface treating layer since the tensile strength of the layer can be strictly adjusted by controlling the amount of wax added, whereby a wide variety of materials can be used as a surface treating agent and in addition, the image-retransferring property can be markedly improved. Further, pigments and coloring agents may be contained as one component in the surface treating layer to color the image receiving member by the color of the pigments and the coloring agents in addition to color of the fused ink of the ink layer.

EXAMPLE 7

The following coating composition was coated on a 50 micron thick polyethylene terephthalate film and dried at 80° C. to form a smooth surface treating layer having a contact angle with water of 39° and a static friction coefficient of about 0.42. The surface treating layer had tensile strength of about 20 kg/cm$^2$ and a melt viscosity at 150° C. of about 2000 to 4000 poises.

| Coating Composition for Surface Treating Layer: | |
|---|---|
| Polyethylene ("Chemipearl M-200", produced by Mitsui Petrochemical Industries, Ltd.) | 80 weight portions |
| Titanium oxide ("TIPAQUE A-100", produced by Ishihara Sangyo Kaisha, Ltd.) | 20 weight portions |
| Fluorine surface active agent ("MEGAFAC F-142D", produced by Dainippon Ink and Chemicals, Inc.) | 0.01 weight portions |

Onto the thus prepared image-retransferable sheet was thermally transferred an ink using a heat-sensitive transferring type word processor ("P-TOUCH", produced by Brother Industries, Ltd.), whereby a dry-processing image-transferring material having an ink image of good quality could be obtained with less thermal energy than that using a conventional image-retransferable sheet. When the ink image of the dry-processing type image-transferring material was retransferred to an image-receiving member, such as paper and plastic articles, by applying pressure thereto, a clear retransferred image was formed on the image receiving member. The dry-processing type image-transferring material on the sheet was hardly moved when pressure was applied, so that it was easy to obtain a good retransferred image. Further, since the surface treating layer was transferred together with the ink image, it was easy to check whether the retransferred image was completed and the resulting retransferred image covered with the surface treating layer exhibited good resistance to friction.

EXAMPLE 8

The following coating composition was coated on a 100-micron thick nylon film and dried at 80° C. to form a smooth surface treating layer having a contact angle with water of 76° and a static friction coefficient of about 0.77. The surface treating layer had tensile strength of 15 kg/cm$^2$ and a melt viscosity at 150° C. of about 5000 poises.

| Coating Composition for Surface Treating Layer: | |
|---|---|
| Ionomer Resin ("Chemipearl SA-100", produced by Mitsui Petrochemical Industries, Ltd.) | 70 weight portions |
| Azo organic pigment ("CROMOPHTAL Yellow 3G", produced by CIBA GEIGY) | 20 weight portions |
| Fluorine surface active agent ("MEGAFAC F-177", produced by Dainippon Ink and Chemicals, Inc.) | 0.01 weight portions |

Using the thus prepared image-retransferable sheet, a dry processing type image-transferring material was produced in the same manner as in Example 1 and subjected to pressure-sensitive image-retransferring processing. As a result, a clear retransferred image was formed on the image receiving member. In case of the fluorine compound is added to the surface treating layer, the transfer from the surface treating layer where the fused ink is not transferred other than the surface treating layer where the fused ink is transferred to the image receiving member is prevented.

While the invention has been described in detail and with reference to specific embodiments thereof, it will be apparent to one skilled in the art that various changes and modifications can be made therein without departing from the spirit and scope of the invention.

What is claimed is:

1. An image-retransferable sheet for retransferring an image of a transferred ink by a heat sensitive transferring method onto an image receiving member comprising:

a substrate having a first surface and a second surface which is opposed to the first surface;

a layer of a surface treating agent coated on the first surface of said substrate, said layer having an exposed surface and a tensile strength of from about 1 kg/cm$^2$ to about 100 kg/cm$^2$; and an ink image on the exposed surface of said layer of surface treating agent coated on the first surface of said substrate, said ink image being transferred by the heat sensitive transferring method onto the exposed surface of said layer, whereby the ink image is retransferred onto the image receiving member together with said layer of said surface treating agent, substantially the entire portion of said layer of said surface treating agent which underlies the ink image releasing from said first surface of said substrate by application of pressure to the second surface of said substrate, so that said layer of said surface treating agent covers said ink image retransferred on the image receiving member.

2. The image-retransferable sheet as claimed in claim 1, wherein said layer of the surface treating agent contains wax.

3. The image-retransferable sheet as claimed in claim 1, wherein said layer of the surface treating agent contains a fluorine compound.

4. The image-retransferable sheet as claimed in claim 1, wherein said layer of the surface treating agent contains a silicon compound.

5. The image-retransferable sheet as claimed in claim 1, wherein the surface treating agent has a melting or softening point of at least about 100° C. or a melt viscosity at 100° C. of at least about 1000 poises.

6. The image-retransferable sheet as claimed in claim 1, wherein said layer of the surface treating agent is formed from a fine dispersion of said surface treating agent.

7. The image-retransferable sheet as claimed in claim 1, wherein said substrate is transparent.

8. The image-retransferable sheet as claimed in claim 1, wherein said substrate has a thickness of about 25 to about 200 microns.

9. The image-retransferable sheet as claimed in claim 1, wherein said layer of the surface treating agent contains pigment.

10. An image retransferring sheet for receiving a heat transferred image on one surface thereof and transferring the ink image to a receiving surface upon application of a transferring pressure to a surface of the sheet opposed to said one surface comprising;

a supporting substrate having a first surface and a second surface opposed to the first surface;

a layer of a surface treating agent on the first surface of the substrate, said layer having a tensile strength of less than about 100 kg/cm$^2$ and a melting or softening point of at least about 100° C. or a melt viscosity at 100° C. of at least about 1000 poises.

11. An image retransferring sheet as in claim 10, wherein the layer of surface treating agent has a tensile strength of less than about 20 kg/cm$^2$.

12. An image retransferring sheet as in claim 10, wherein an ink image is transferred onto the layer of surface treating agent and wherein, when a transferring pressure is applied to the second surface of the substrate to transfer the ink image to the receiving surface, the portion of the surface treatment layer on which the ink image is transferred is carried with the ink image as the ink image is transferred to the receiving surface.

13. An image transferring sheet as in claim 10 wherein the surface treating agent includes a wax.

14. An image retransferring sheet as in claim 10 wherein the surface treating agent includes a fluorine compound.

15. An image retransferring sheet as in claim 10, wherein the surface treating agent includes a silicone compound.

16. An image retransferring sheet as in claim 10, wherein the layer of said surface treating agent is formed from a fine dispersion of said surface treating agent.

17. A method of applying an ink image on a receiving surface comprising the steps of:

transferring an ink image directly onto a layer of a surface treating agent carried on a first surface of a substrate;

placing the substrate on the receiving surface with the ink image facing the receiving surface;

applying a transferring pressure to a second surface of the substrate opposite to the said first surface to transfer the ink image and the portion of the surface treating layer which underlies the ink image onto the receiving surface; and thereafter removing the substrate from the receiving surface.

18. The method as in claim 17, wherein the step of transferring an ink image comprises thermally transferring said ink image from a carrier onto the layer of surface treating agent.

* * * * *